Nov. 21, 1939.  J. S. GAY  2,180,869
METHOD OF AND TEMPLET PUNCH FOR STAMPING FLAT SHEET METALWORK
Filed March 31, 1937  2 Sheets-Sheet 1
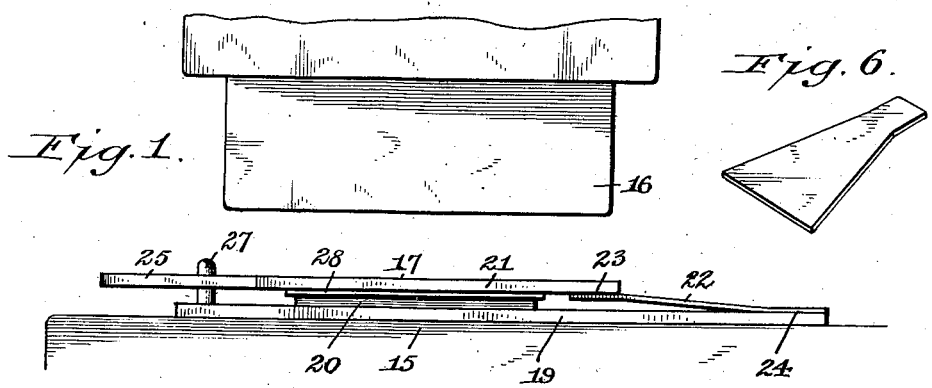
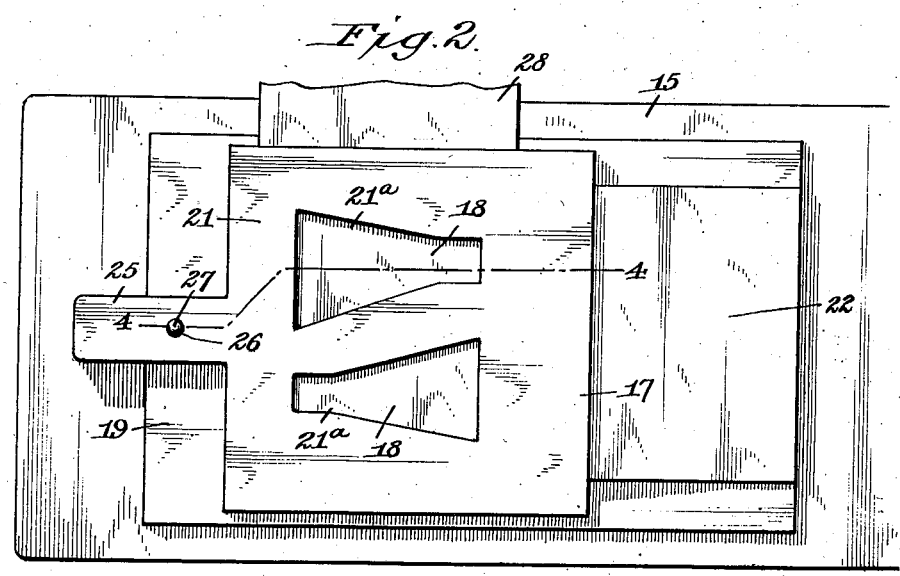
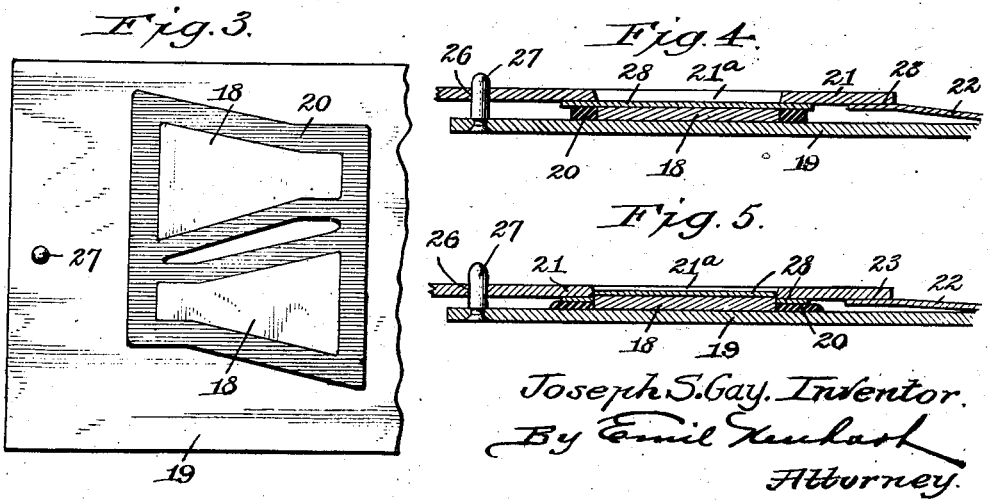
Joseph S. Gay, Inventor.
By Emil Neuhart
Attorney.

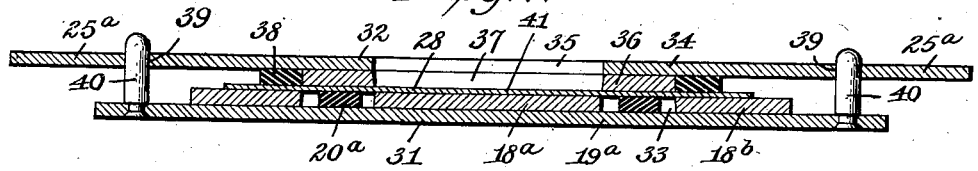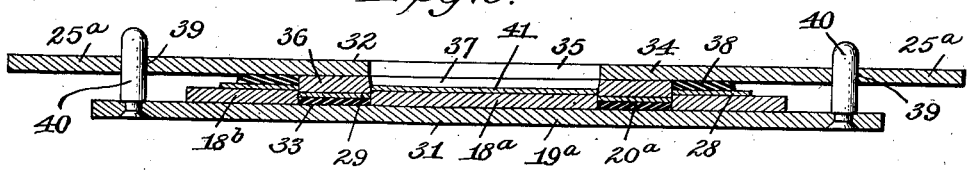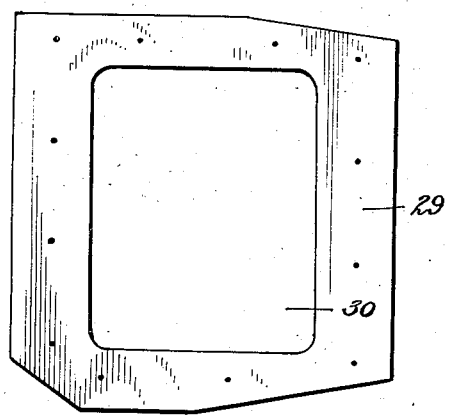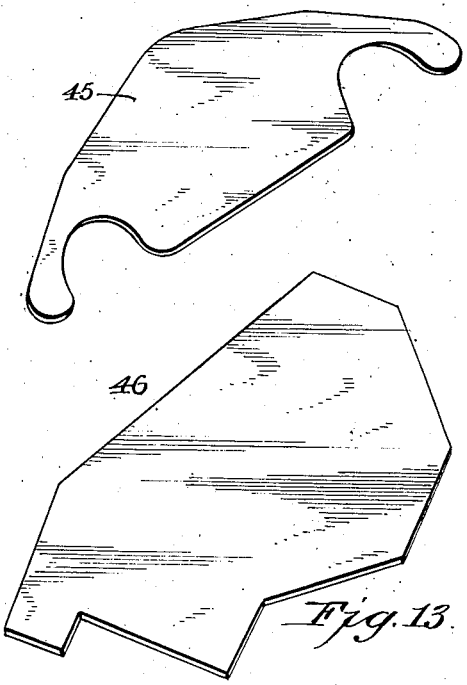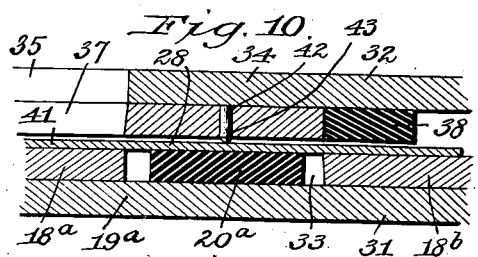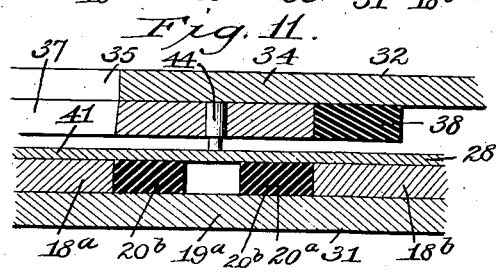

Patented Nov. 21, 1939

2,180,869

UNITED STATES PATENT OFFICE 2,180,869

METHOD OF AND TEMPLET PUNCH FOR STAMPING FLAT SHEET METALWORK

Joseph S. Gay, Buffalo, N. Y.

Application March 31, 1937, Serial No. 134,019

10 Claims. (Cl. 164—18)

My invention relates to means for stamping or punching sheet-metal material, and more particularly to templet punches for such purposes and to the method of stamping or punching the same.

In the many industries, and particularly in the industry of manufacturing airplanes, many flat fittings or parts or flat partially formed fittings or parts are employed, and due to the fact that these are not always used in large quantities and vary in shape or form in different models of airplanes, the cost of producing the same is exceedingly heavy, especially when the conventional tool-steel male and female dies are employed in the stamping or forming of the same. Due to such expense, the use of regular dies are now dispensed with and a templet formed to the exact shape and size of the article to be stamped, which templet is used to scribe on sheet-metal plates or the like, the outline of the parts to be worked or fashioned to shape in conformity with the templet used.

Assuming a few fittings or other elements of a kind are desired, as now generally practiced, the templet is laid upon the flat sheet-metal material or other stock to be used, and the outline of the templet scribed upon the material or stock each time such a fitting or element is to be made. The material or stock is then cut to the outline scribed by means of hack saws, shapers, nibblers and files, or any combination of such machines and/or tools, until the part worked upon is an exact duplicate of the templet used as a scriber. Such methods are exceedingly slow, laborious, and expensive, and call for the employment of experienced and skilled workmanship. Where the number of parts required is comparatively small, this method of procedure is less expensive than the manufacture of expensive tool-steel dies for stamping the material or stock to the desired outline, or even to the exact formation desired.

The primary object of my invention is to utilize the templet now employed to scribe the outline of the desired object on sheet-metal or other sheet material, usually chrome-moly or other hardened steel having a maximum thickness of three-eighths of an inch, and herein referred to as stock, as a die-member; and to provide a co-acting die-member which requires no more expense to produce than the forming of the first element or object when hand-fashioned by the use of the templet, in the manner above referred to.

Another object of my invention is to provide simple and inexpensive means for punching or stamping flat sheet-metal parts or elements to desired shape without resorting to the use of expensive tool-steel dies produced by high-priced labor, and to employ the templet, now found necessary to form flat sheet-metal objects in limited quantities, as part of the punching or stamping device.

Another object of my invention is to provide novel means associated with a templet-die device for cushioning the action of said device and at the same time utilize the same to serve as stripping means.

A further object is to provide a new method of punching or stamping flat sheet-metal or similar material, according to which the hand work now resorted to is dispensed with when a limited quantity of punched or stamped parts is required, and whereby the use of inexpensive tool-steel dies, now resorted to in many industries, is entirely obviated.

The invention therefore consists in the use of a templet as one of the die members of punching or stamping devices or mechanism when used in association with a co-acting member.

The invention also consists in certain novel features of construction and combination of parts, and in the novel method of manufacturing sheet-metal fittings or parts of various kinds or shapes, as described hereinafter and more particularly pointed out in the sub-joined claims.

In the drawings, Fig. 1 is a front elevation of my improved templet-punching or stamping device shown in association with two relatively movable parts of a punching or stamping press.

Fig. 2 is a top plan view of the templet-punching or stamping device as it appears on the bed of a punching or stamping press.

Fig. 3 is a top plan view of the male die-member of this improved device.

Fig. 4 is an enlarged longitudinal section taken on line 4—4, Fig. 2, showing a sheet or strip of metal interposed between the co-operating die members and said die members in position to stamp a fitting or other object from said sheet or strip of metal in conformity with the templet employed as one of the parts of the die-device.

Fig. 5 is a similar section showing the die-members in position after operation upon the sheet or strip of metal.

Fig. 6 is a perspective view of the flat sheet-metal fitting stamped according to the outline of the die-members shown in Figs. 2 and 3.

Fig. 7 is a section similar to Figs. 4 and 5, showing an enlargement of the inventive thought involved, or a modification of the parts disclosed in the previous figures, whereby a sheet-metal fitting or part having a comparatively large opening therein is stamped to finished form in one operation, the parts of the punching or stamping device being shown in the positions they assume preparatory to punching or stamping the sheet metal or stock to desired form.

Fig. 8 is a similar view showing the parts brought into action to stamp or punch the desired object from the sheet of metal.

Fig. 9 is a view of a sheet-metal part stamped to shape by means of the die-members illustrated in Figs. 7 and 8.

Figs. 10 and 11 are enlarged detail views on the plane of the sections shown in Figs. 7 and 8, showing respectively means for simultaneously point-punching and perforating sheet-metal while stamping the same to the desired outline, either as the finished or partly finished sheet-metal article desired.

Figs. 12 and 13 are perspective views of sheet-metal parts employed in special models of airplanes, and which are easily and inexpensively stamped by the use of this invention.

Referring to the drawings in detail, the numeral 15 designates, for example, the bed or table of punching or stamping press, and 16 what may be termed the ram of such press; these two parts being relatively movable and adapted to have my improved templet-punch or die-device interposed between the two to be effectively actuated.

The die-mechanism, or stamping device as it may be termed, considered as a whole, is designated by the numeral 17. It is placed upon the bed or table 15 and may be retained in a fixed position thereon in any approved manner. Said die-mechanism is formed wholly out of sheet-metal, preferably chrome-moly or other hardened steel; and the parts forming the same vary in thickness, depending on the thickness of the material from which fittings or other objects are to be stamped; but for all practicable purposes would have a thickness not exceeding three-eighths of an inch.

Assuming, for example, that the stamping shown in Fig. 6 is to be punched out of sheet metal, a counterpart of the finished article is fashioned in any approved manner from a sheet of chrome-moly or other hardened steel, which may be twice the thickness of the material from which the fitting is to be stamped, but a templet-die one-eighth of an inch in thickness will accurately cut chrome-moly steel three thirty-seconds of an inch in thickness, while allowing my improved cushioning or stripping means to function efficiently. Under present-day methods, such counterpart is fashioned to shape and used as a templet for scribing the outline upon sheet-metal stock, after which, by means of saws, shapers, nibblers, and files, or any combination of such tools and/or machines, the scribed object is severed from the sheet-metal stock and serves as the finished fitting or other object.

Each time such a fitting or object is made, this common method of procedure is repeated, the result being exceedingly slow production; moreover, the services of skilled artisans are required.

Another way of producing similar sheet-metal fittings or stampings is to produce the usual expensive tool-steel dies, the construction of which would require fully as much, if not more time than in producing two or three hundred fittings or stampings in accordance with this invention. Consequently, in forming such fittings or other stampings with my improved die mechanism, and according to my improved method, I utilize a templet of the fitting or stamping to be formed, and rivet or otherwise secure the same to a foundation plate; and when reference is made herein to a templet or templet-die or die-member, it is to be understood as meaning a part fashioned to shape from hardened sheet metal, and does not include die stock which invariably exceeds several times the thickness of the maximum gauge of sheet metal employed in my invention and requires the services of die-makers in order to produce the same.

In the drawings, the numeral 18 designates the templet, which I prefer to term a templet-die, and 19 the foundation plate. As shown in Fig. 3 of the drawings, two such templets are shown mounted on the foundation plate and each is surrounded with a combined cushioning or stripping element 20 in the form of compressible rubber molded to the shape of the templet dies 18, or cut out of sheet rubber to form openings therein which conform more or less to the templet-dies. If desired, such cushioning or stripping element may be formed of several pieces of rubber disposed along various regions around the templet-die, either in contact therewith or in close proximity thereto; and while any such type of cushioning and stripping means may answer the purpose, that believed to be most effective is the type in which the rubber completely surrounds the templet-die or dies, and in which the rubber is in contact with the edges of the die or dies. It is preferred to have the rubber cushioning or stripping element of the same thickness as the telmplet-die 18, and this is clearly shown in Fig. 4 of the drawings.

It may here be stated that when the templet-die is machined or otherwise fashioned to shape from suitable sheet material, such as chrome-moly steel, it is tempered or hardened in any approved manner; the corners formed by the upper face and the edges of the die being made shearing-sharp.

The foundation plate 19 and the templet-die or dies 18 serve as the mole member of the die-mechanism, and the cushioning or stripping element may also be considered as a part of said die-member. It will be apparent, therefore, that the forming of the templet-die involves no more expense in time or labor than the making of the usual scribing templet employed for the purpose of manually fashioning fittings or stampings from sheet-metal stock; and where such a templet is now in existence and it is of a suitable thickness, it may be hardened and employed as the templet-die so as to form part of the male die-member of the device. Associated with the male die-member is a female die-member which is also formed of sheet-metal stock, preferably chrome-moly steel, and has cut into it an opening or openings 21ª conforming to the shape of the templet-die or male die-member. When the female die-member is thus fashioned, it is also hardened, and the walls of the opening or openings 21ª formed therein are slightly beveled upwardly or outwardly, if desired, so as to provide clearance for the sheet-metal material which may be forced into or through said openings by the templet-die or dies. The female die-member thus formed is positioned so that the male die-member is in exact registration with the opening or openings 21 in the female die member, and it is preferably retained in this position by a sheet metal resilient retainer strip 22 which is welded or otherwise secured to the under-side of the flat female die-member, as at 23, and distantly therefrom to the foundation plate 19, as at 24. This yielding retainer strip is comparatively thin, yet provides the necessary rigidity to maintain the female die-member in proper registration with the male die-member. It nevertheless may be said to serve as a flexible connection between the female die-member and the foundation plate 19.

The female die-member has a handle or finger-grip 25 extending therefrom opposite the yielding or flexible retainer strip 22, and by means of this handle or finger-grip the female die-member may be elevated to permit the ready introduction of a strip or sheet of metal or other stock from which the fittings or other elements are to be stamped to be freely inserted between the two die members; and for the purpose of preventing the female die-member from being moved out of registration with the male die-member, it is provided with a guide-opening 26 in the handle or finger-grip which receives a guide-pin 27 extending upwardly from the foundation plate 19. This guide-pin may be of sufficient length to enable the female die-member to be elevated under flexure of the yielding retainer-strip 22 without withdrawing the guide-pin 27 from the opening 26. Thus elevated, the sheet-metal or other stock may be easily inserted between the flat female die-member and the upper face of the templet-die or dies 18, also referred to as a die-member.

It is of course to be understood that although I have shown two templet-dies in the construction illustrated in Figs. 2 and 3, and two openings in the female die-member to co-act with the templet-dies, this may be found of advantage only where the fittings or stampings are comparatively small, or where they differ in shape and occupy comparatively small space.

While the templet-dies shown in Fig. 3 are of somewhat similar outline, they vary in measurement. Consequently, two different fittings or stampings are produced under one operation of the press.

I desire here to state that the forming of the openings in the female die member is a simple and inexpensive operation as compared to the making of heavy dies out of tool-steel; and as this is the only particular machine operation resorted to in addition to using the ordinary templet and converting it into a templet-die, it will be clear that this die-mechanism is extremely compact and inexpensive. Its compactness results from the fact that only sheet-metal stock is employed, and if desired, the foundation plate may even be dispensed with and the templet-die pinned or otherwise secured directly to the bed or table of the press.

While a punching or stamping press is considered the most efficient means of operating the die-mechanism, stamping may be effected by any other means, especially when small fittings or the like are to be stamped from sheet-metal, such as positioning the die-mechanism between the jaws of a vice, or other similar device or apparatus. It is of course essential that the templet-die 18 and its surrounding cushion 20 be thicker than the material from which the fittings or other stampings are to be punched, as will be clear from the disclosures made in Figs. 4 and 5. In Fig. 4 the sheet of metal 28 is shown between the templet-die or male die-member and its surrounding cushion and the female die-member 21, without pressure being exerted on either the male or female die-member. However, in Fig. 5, the female die-member is forced downwardly so that the templet-die 18 is entered slightly in the opening 21ᵃ formed in the female die-member, causing the shearing of the sheet metal 28 with an outline exactly that of the templet-die 18; that portion of the sheet metal overhanging the templet-die and lying upon the cushioning element 20 being forced downwardly around the templet-dies by the female die-member, with the result that the cushion 20 is compressed and laterally distended, as clearly shown by comparison between Fig. 5 and Fig. 4. Thus the sheet-metal fitting or other stamping enters the opening in the female die-member and can be removed therefrom after relieving the female die-member of pressure, caused for example, by elevating the ram 16 of the press. The sheet-metal thus stamped will automatically retain its position on the templet-die while the cushioning element 20 retrieves its normal condition and formation, acting to strip the surrounding portion of the sheet metal from the templet-die. Therefore, relieving pressure from the female die-member in the manner hereinbefore stated, the stamped fitting may easily be removed from between the two die-members, and the sheet-metal 28 advanced through the die-mechanism so that an unstamped portion thereof is positioned over the templet-die or dies for further action.

In Figs. 7 and 8 I have illustrated an enlargement of my inventive thought by means of which fittings and other stampings having openings therein may be punched out of sheet metal or other sheet material, a fitting of this kind being illustrated in Fig. 9 wherein the particular object shown is a door frame 29 adapted to be fastened to the wall of an airplane around an opening formed therein, said door frame having a door-opening 30 which is stamped out of sheet material simultaneously with the exterior formation of the door frame. The die-mechanism employed for such purposes comprises two die-members, 31, 32; each of which is a combination male and female die-member. The die-member 31 comprises the foundation plate 19ᵃ to which is welded, riveted, or otherwise secured a templet-die 18ᵃ, and surrounding said templet-die in spaced relation thereto is an auxiliary templet-die 18ᵇ; the space 33 between said templet-dies 18ᵃ and 18ᵇ; being occupied, or partly occupied by a combined cushioning and stripping element 20ᵃ. I prefer in this die structure, which I term a double-action die, to provide a header-plate 34 which is also constructed of sheet-metal and has formed therein an opering 35 approximating the shape of the templet-die 18ᵃ. To the underside of said header-plate 34 a templet-die 36 is secured by welding, riveting, or otherwise fastening it thereto. This templet-die is provided with an opening 37 conforming to the templet-die 18ᵃ so that the two co-act with a shearing effect, and the formation of the templet-die 36 is such that it will enter the intervening space 33 between the templet-dies 18ᵃ and 18ᵇ under shearing action. Surrounding the templet-die 36 is a combined cushioning and stripping element 38.

The die-member 32, which may be referred to as the upper die-member, may have laterally extending handles or finger-grips 25ᵃ similar to that provided on the female die-member shown in the single-action die-mechanism illustrated in the preceding figures, and in each handle or finger-grip a guide-opening 39 is formed, through each of which extends a guide-pin 40 projecting upwardly from the foundation-plate 19ᵃ. Thus the templet-die of the upper die-member is maintained in co-acting relation with the templet-dies of the lower die-member, and the upper die-member may be easily elevated on its guide pins 40 to enable a sheet of metal or other stock 28 to be interposed between the two, the metal or stock resting on the lower die-member and supporting the upper die-member.

When placing the upper die-member under pressure in any approved manner suitable for the purpose, the templet-die 36 of said die-member is forced into the space 33 of the lower die-member, causing the cushioning or stripping element 20ᵃ therein to be compressed and laterally distended, as shown in Fig. 8, while the templet-die 18ᵃ is forced into the opening 37 in the templet-die 36, and the auxiliary templet-die 18ᵇ of the lower die-member is forced upwardly around the templet-die 36 on the under-side of said upper die-member, causing the cushioning or stripping element 38 to be compressed and laterally distended, as shown in Fig. 8. Thus the sheet metal or other stock is sheared to form the door frame 29 and separates from the stock a portion of the metal in the region 41 so as to form the opening 30 of the door frame. Upon relieving the die-members of pressure, the cushioning and stripping elements 20ᵃ and 38 immediately expand to cause the two die-members to return to their normal positions, as indicated in Fig. 7. Upon elevating the upper die-member on its guide pin 40, the severed portion 41 and the door frame may be easily removed from between the die-members and the stock advanced to position an unstamped region between the die-members for stamping an additional door frame. It is of course understood that the stock removed from the material being stamped to form the opening 30 in the door frame may be utilized for stamping small fittings or other elements, such as shown for example in Fig. 3.

While the door frame shown in Fig. 3 is merely illustrative of a stamped article produced by means of this double-action die-mechanism, many other articles involving more than the outline-shearing of the article would necessitate the use of a double-action die-mechanism of the general type described, such articles varying in form and size, according to the use intended for the same.

As shown in Fig. 9, the door frame illustrated is provided with spaced-apart point-punches; and when such features are desired to be added to the article being stamped, one of the templet-dies, for example the templet-die 36, is provided with point-punches 42, as shown in Fig. 10; each of such point-punches being provided with a conical lower terminal 43 whose length is less than the thickness of the material being punched. The point-punches are positioned directly over the cushioning or stripping element 20ᵃ and are fixed into the templet-die 36 in the spaced relation desired. In some instances a single point-punch only will be required. The point-punch shown in Fig. 9 may determine the location of attachment of other parts to the door frame, or it may be used for various other purposes, such as indicating a point at which drilling of the door frame is required.

In the construction shown in Fig. 11, the cushioning or stripping device 20ᵃ may be formed in two spaced-apart sections, 20ᵇ, or this cushioning or stripping device may be provided with openings at spaced-apart regions where punch holes are to be formed in the door frame or other object, and in such cases a perforating punch 44 is fastened into the templet-die 36 and extends a sufficient distance below the lower surface thereof so as to completely penetrate the stock where the sections 20ᵇ of the cushioning element 20ᵃ are spaced apart or provided with openings. It will be clear, therefore, that punch holes may be provided in a stamped element simultaneously with the formation of the element.

In Fig. 10 the construction shown is that which is preferable when the two sections 20ᵇ are provided in spaced-apart relation, since upon compression of the cushioning or stripping device, the rubber sections forming the same may be distended in opposition to each other, while being compressed; whereas, if openings are formed in the cushioning or stripping device directly beneath the punches 44, I would form said cushioning or releasing device to occupy only a portion of the width of the space 33 in which it is fitted.

In Fig. 12 a special fitting 45 is shown which is used on an airplane in flat form, and in Fig. 13 a special fitting 46 is illustrated which may require bending when applying the same to a part of an airplane. The several fittings or stampings shown are merely illustrative of the innumerable varieties of fittings or stampings that are used in various industries, and therefore the advantages of this invention are far reaching and result in a tremendous saving in the production of stampings of various kinds, since, if a thousand or less stampings of any kind are required, the die-mechanism shown can be constructed and the stampings made therefrom in less time and at a small fraction of the expense required in providing the usual tool-steel dies, the use of which is now resorted to in many industries, even though stampings or fittings are required in comparatively small quantities.

I particularly desire to stress the fact that the templet-dies are all used in hardened form, and they are fashioned to the desired outline or shape while the stock from which they are made is more or less ductile and therefore easily workable, after which such templet-dies may be annealed in any approved manner.

In the manufacture of airplanes and other machines, apparatus, and articles, many are formed to the individual specifications of the purchaser and a comparatively small number ordered at a time; the drawings and specifications for the same demanding special metallic fittings or elements which would not warrant the expense of making steel-cut or similar dies. Consequently, in many instances, a templet of the desired fitting or element is made and is employed to scribe the outline of the same upon metal or other stock from which the fitting is to be made. Each individual fitting is then required to be cut out of the stock, and for this purpose saws, shapers, nibblers, and files are used to complete the same; such fittings or elements requiring the same degree and exactness of work as the forming of the scriber-templet. Consequently, a fitting of which fifty exact counterparts are required is expensive to produce under such methods; but in the absence of a more efficient method, such methods are now employed. Manifestly, the form of a simple templet, properly hardened and used as a templet-die in the manner described, requires only the formation of a interfitting associate part, or two interfitting associate parts where an article is to be formed in which a comparatively large opening is provided therein. With the exception of the annealing of such co-acting parts, the entire die structure can be produced at the cost of making a single fitting, the remaining forty-nine of the fifty fittings being produced in less time than the formation of the second fitting under the methods now employed.

It has been my experience that die-mechanism of this kind has been made for forty fittings to be used in an airplane for which a trial order was given, without any assurance of additional orders being received. When, however, additional orders were unexpectedly given by the purchaser, a comparatively large number of such fittings were required which would ordinarily be stamped with dies cut from tool or other suitable steel by die makers; but having had the templet-dies prepared for the trial order, the large quantity later used was made with the same templet-dies as efficiently and effectively as though regulation tool-steel dies were employed.

I am aware that it is not new to employ a comparatively thin die-member and use the same in opposition to a rubber or other cushioning bed, but these are only suitable for stamping thin sheets, such as tin or lead foil, paper and the like; and where even soft sheet material is to be stamped with the use of a rubber or other cushioning element employed as a press member, the actual die-member must be of a thickness considerably greater than possible to form out of sheet-metal. Consequently, die mechanism which includes a rubber element employed in opposition to the actual die calls for a die of a thickness requiring the services of die makers, since the die must receive the rubber co-acting element deeply into or around the actual die before shearing of the soft sheet-metal can take place, and a press so large and powerful would be required that the use of such stamping mechanism would be valuable only to comparatively few plants.

My invention therefore differentiates over methods in which a bed or cushioning element co-operates with a die-member in stamping material; and with such stamping mechanism, regardless of the method used, chrome-moly or other hardened steel cannot be stamped to form, since only indentation of the metal will take place.

Where, therefore, in the claims reference is made to a sheet-metal templet, templet-die or die-member, or sheet-metal part, it is intended to mean hardened sheet-metal parts not employed in the construction of regulation tool-steel dies, such as always employed under male and female association when stamping sheet metal, since such dies are always constructed of comparatively thick bar or block steel.

Having thus described my invention, what I claim is:

1. The method of punching or stamping sheet-metal fittings or the like from sheet material, consisting in the utilization of a hardened templet formed of sheet-metal and in conformity with which a counterpart is to be stamped from the sheet material, and the employment of a sheet-metal part co-acting with said templet to shear the material in conformity with the shape of said templet under the application of pressure causing relative movement of said templet and sheet-metal co-acting part.

2. The method of punching or stamping sheet-metal fittings or the like from sheet material, comprising the forming of a hardened sheet-metal templet and the utilization of the same as a die in association with a compressible cushioning element adjacent said die and with a co-acting sheet-metal part arranged in shearing relation to said die so as to compress said cushioning element, and in the employment of sufficient power to move said die and sheet-metal part relatively to cause shearing of sheet-metal material placed between the two in conformity with the shape of said die.

3. Die-mechanism for punching or stamping flat sheet metal, comprising a flat sheet-metal templet-die thicker than the thickness of the sheet metal to be punched or stamped thereby a flat sheet-metal element having an opening therein conforming to that of the templet-die and positioned in relation to the latter that a sheet of metal may be placed between said templet-die and flat sheet-metal element, and means for relatively moving said templet-die and flat sheet-metal element.

4. Die-mechanism for punching or stamping flat sheet metal, comprising a flat sheet-metal templet hardened and utilized as a die-member, said templet being shaped in conformity with the article to be stamped, a sheet-metal member co-acting with said templet and constructed to cause shearing of stock placed between said templet and said co-acting sheet-metal member in conformity with the outline of said templet, said templet and co-acting sheet-metal member being relatively movable and arranged to permit the introduction of stock to be punched or stamped between the two, and stripping-means surrounding said templet and yieldabe under movement of said co-acting element in one direction and self-retrievable to release the stock from said templet when moved in its other direction.

5. Die-mechanism for punching or stamping flat sheet metal, comprising a flat sheet-metal templet hardened and utilized as a male die-member, said templet being shaped in conformity with the article to be stamped and being mounted on a fixed support, a sheet-metal element serving as the female die-member and constructed to receive the male die-member thereinto, said female die-member being secured to a movable pressure or power element, and rubber cushioning means surrounding said male die-member compressible under movement of said female die-member during the act of punching or stamping sheet material placed between the latter and said male die-member, said cushioning means being self-retrievable upon relieving said female die-member of force.

6. The combination with a suitable foundation and a power medium, of die-mechanism having co-acting die-members formed of sheet metal not exceeding one-quarter inch in thickness to enable their being fashioned to shape with means employed to fashion a sheet-metal templet, one of said die-members being mounted on said foundation and the other being adapted to be actuated by said power medium, said die-members being relatively disposed to permit hardened sheet-metal to be punched or stamped to be introduced therebetween, the die-member mounted on said foundation being of a thickness greater than that of the stock to be punched or stamped, and a rubber cushioning-element surrounding the last-mentioned die-member and of a thickness substantially equaling that of the latter.

7. Die-mechanism comprising two die-members formed of flat sheet metal relatively movable and adapted to have sheet metal to be stamped or sheared to form placed between the two, one of said die members comprising a foundation member having a guide-pin projecting therefrom and a die portion mounted thereon, the second die-member comprising a flat plate having an opening therein conforming in shape to the die portion of said first-mentioned die-member and provided with a guide-opening through which said guide-pin extends, and a resilient retainer-strip secured to said second die-member and to said foundation member at a point spaced from said second die-member.

8. Die-mechanism comprising two die-members formed of flat sheet metal and being relatively movable and adapted to have sheet-metal to be stamped or sheared to form placed between the two, one of said die-members comprising a sheet-metal foundation plate, the other die-member being formed of sheet-metal having a die-receiving portion therein to receive said templet-die, and means to flexibly connect said last-mentioned die-member with said foundation plate.

9. Die mechanism comprising co-acting sheet-metal die-members between which sheet metal to be stamped is to be positioned, a rubber cushioning element in the plane of movement of one of said die-members, and point punches projecting from said last-mentioned die-member and adapted to press the sheet-metal being stamped into said rubber cushioning element to form point marks in said sheet metal.

10. Die mechanism comprising a sheet-metal templet-die, a rubber cushioning element in contact with the peripheral edge of said templet-die at all points around the same, a sheet-metal die-member positioned directly over said cushioning element and adapted to receive said templet thereinto, and punches projecting from said female die-member adapted to act upon the sheet-metal above said cushioning element.

JOSEPH S. GAY.